F. B. GIESLER.
ROTARY DRIER.
APPLICATION FILED SEPT. 16, 1910.
1,006,647.
Patented Oct. 24, 1911.
6 SHEETS—SHEET 1.
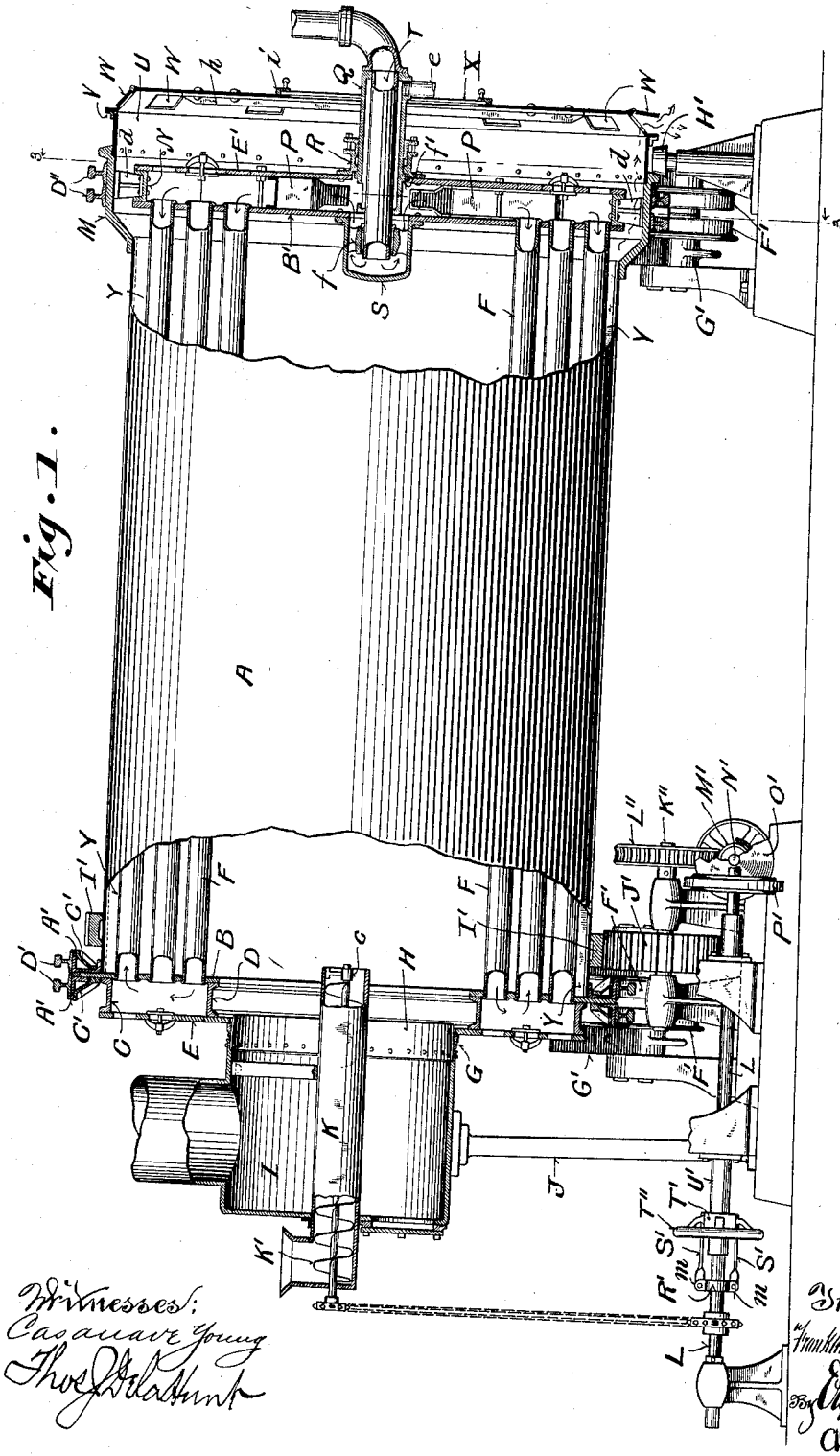

F. B. GIESLER.
ROTARY DRIER.
APPLICATION FILED SEPT. 16, 1910.
1,006,647.
Patented Oct. 24, 1911.
6 SHEETS—SHEET 2.
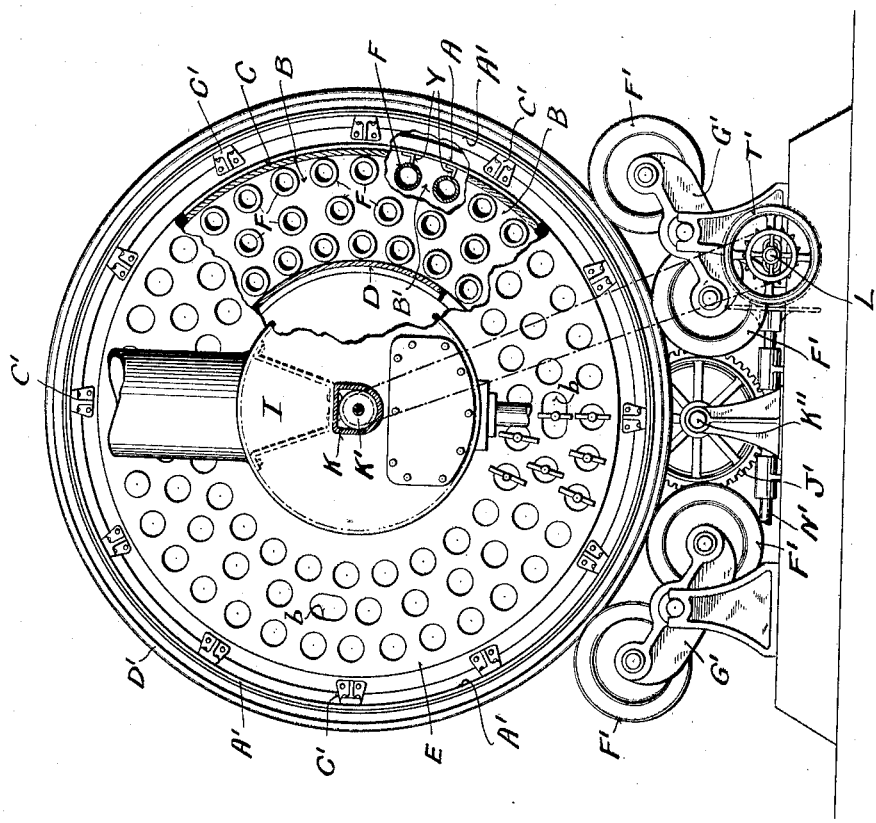

F. B. GIESLER.
ROTARY DRIER.
APPLICATION FILED SEPT. 16, 1910.
1,006,647.
Patented Oct. 24, 1911.
6 SHEETS—SHEET 3.
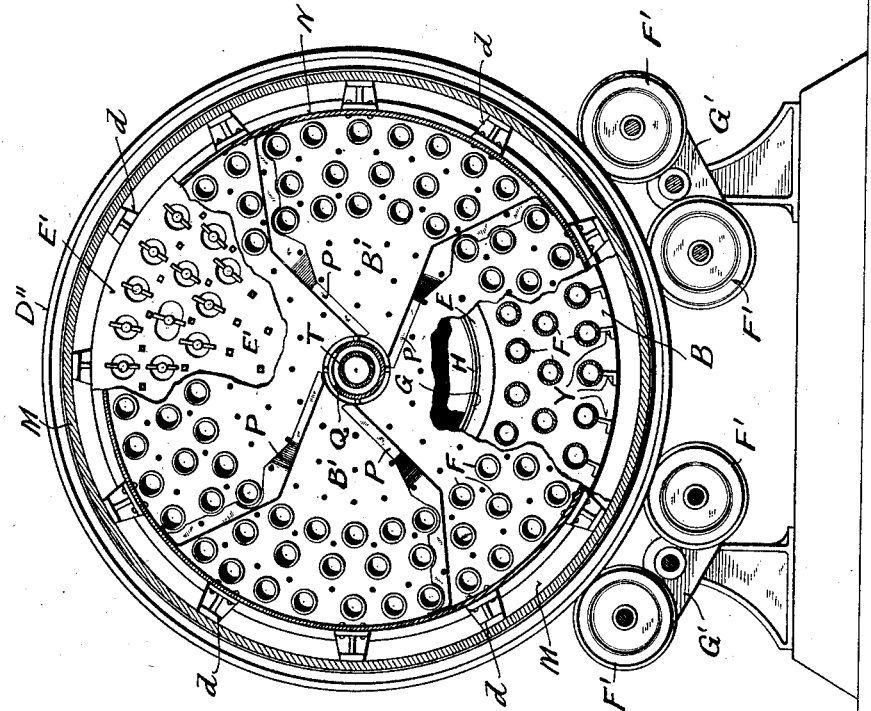

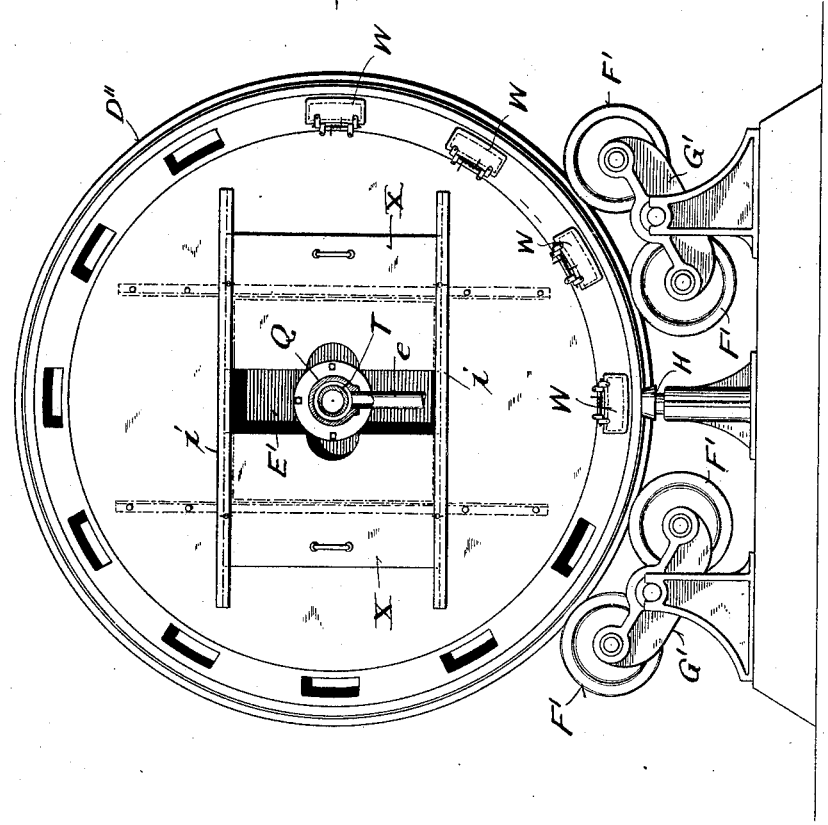

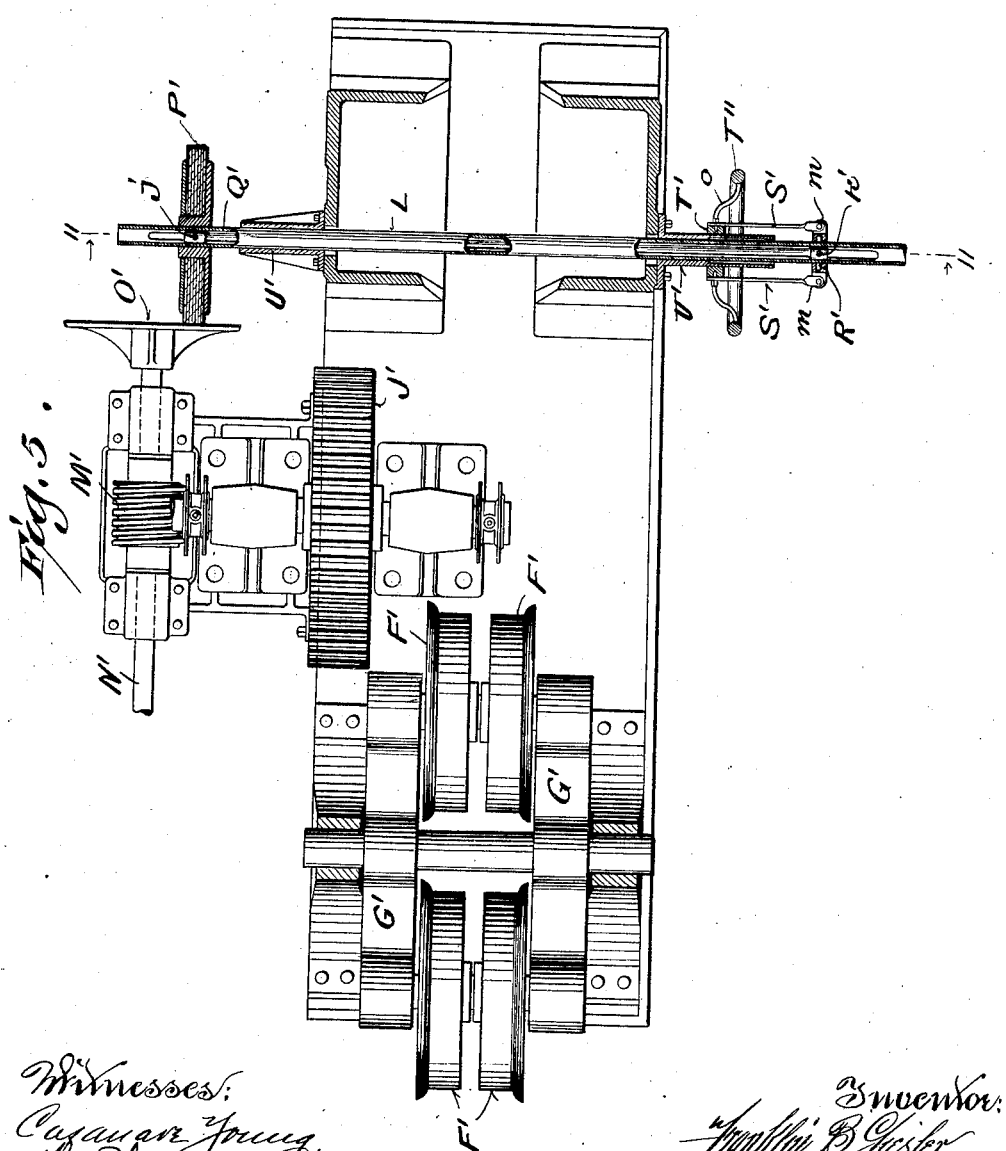

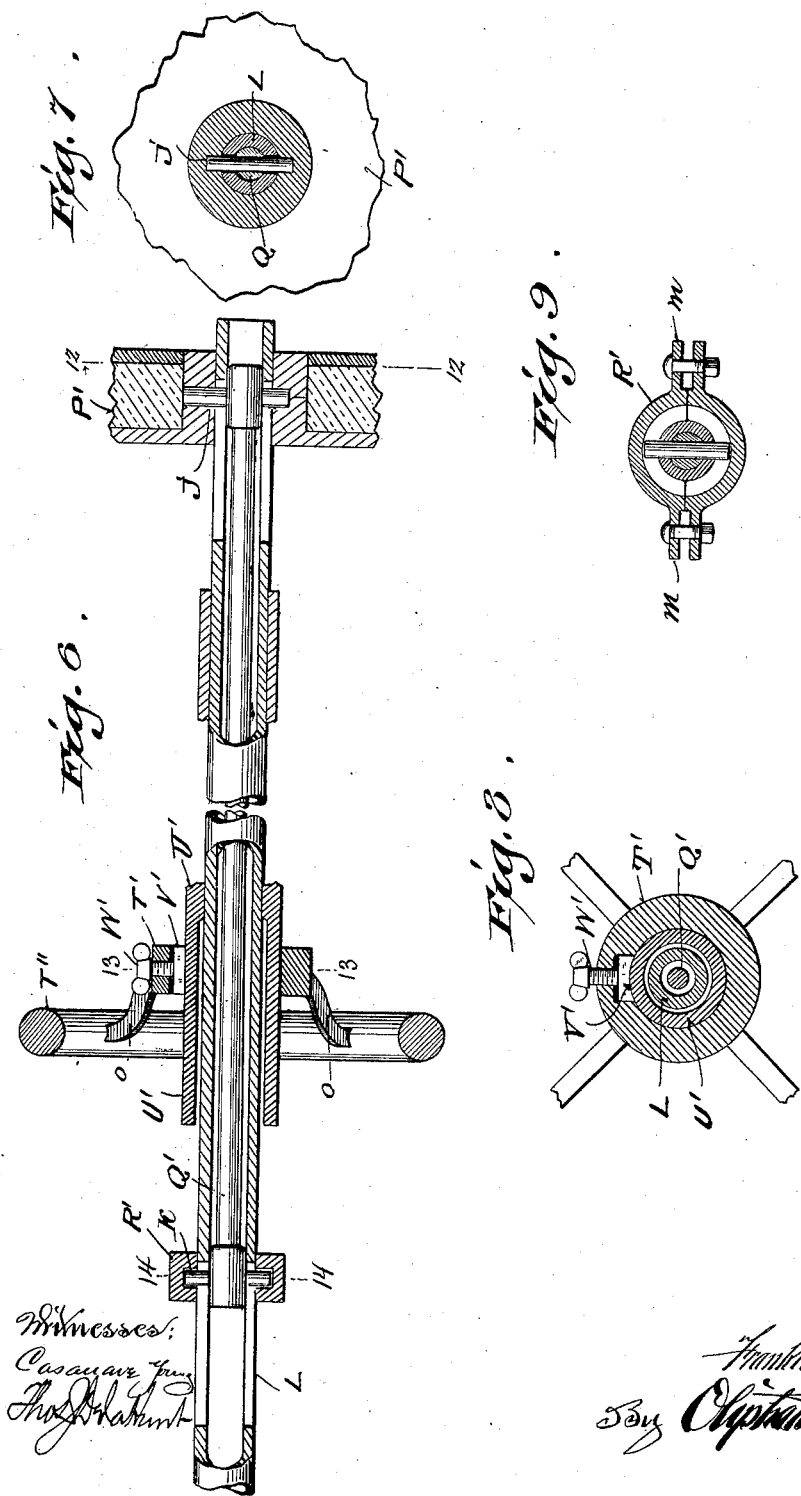

UNITED STATES PATENT OFFICE.

FRANKLIN B. GIESLER, OF MILWAUKEE, WISCONSIN, ASSIGNOR TO THE GALLAND-HENNING PNEUMATIC MALTING DRUM MFG. CO., OF MILWAUKEE, WISCONSIN.

ROTARY DRIER.

1,006,647.   Specification of Letters Patent.   Patented Oct. 24, 1911.

Application filed September 16, 1910. Serial No. 582,337.

*To all whom it may concern:*

Be it known that I, FRANKLIN B. GIESLER, citizen of the United States, and resident of Milwaukee, in the county of Milwaukee and State of Wisconsin, have invented certain new and useful Improvements in Rotary Driers; and I do hereby declare that the following is a full, clear, and exact description thereof.

My invention consists in what is herein particularly set forth with reference to the accompanying drawings and pointed out in the claims of this specification, its object being to improve the construction and efficiency of rotary driers of the species described in Letters Patent No. 694,366, issued to me March 4, 1902.

Figure 1 of the drawings represents a side elevation of my improved rotary drier partly broken and in section; Fig. 2, an elevation of the feed and drive end of the drier partly broken and in section; Fig. 3, a partly transverse sectional view of the drier adjacent to the delivery end of same, the section being indicated by 3—3 in Fig. 1; Fig. 4, an elevation of the delivery end of the machine partly in section, and Fig. 5, a plan view of the drive-mechanism of the drier partly in horizontal section; Fig. 6, a for the most part horizontal sectional view indicated by 11—11 in Fig. 5, and Figs. 7, 8 and 9 cross-section views respectively indicated by 12—12, 13—13 and 14—14 in Fig. 6.

Referring by letters to the drawings, A indicates the cylindrical main shell of the inclined drier, and B one of the tube-heads of said drier in steam-tight connection with said shell. The diameter of the tube-head B is greater than that of the shell A, and put in steam-tight connection with the outer side of said tube-head is a pair of concentric flanged rings C, D, to which a cover-plate E is suitably secured to provide a steam-chest at the feed end of the drier. The cover-plate E is provided with normally covered hand-holes in register with the tubes F of the drier. Certain of these hand-holes *b* are of elliptical contour and such area as will permit of the passage through the same of the covers for the other round hand-holes in said plate when the drier is being set up or taken apart, said elliptical hand-holes being conveniently located. The hand-hole covers and means for securing the same are of such common knowledge in the art that detail description of the same herein is deemed unnecessary.

The steam-chest cover E is provided with a central circular opening, and engaging this opening is an outwardly projecting ring G in connection with said cover. Engaging the ring G is a packing spout H of leather or other suitable material suitably fastened in the adjacent stationary exhaust-chamber I, a supporting pillar J for said exhaust-chamber being shown in Fig. 1.

Supported in connection with the exhaust-chamber, through which it extends centrally of the same, is a feed-spout K containing a spiral-conveyer K'. The shaft of the conveyer turns in the outer hopper-end of the spout and in a bearing *c* hung in said spout, said shaft being shown in Fig. 1, as having link-belt and sprocket-wheel gear connection with another shaft L to which further reference is had hereinafter, the latter shaft being tubular and longitudinally slotted.

The tube-head B' of the drier is clear of the shell A within the confines of a partly beveled ring M of greater diameter than said shell to which it is rigidly connected. In steam-tight connection with the tube-head B' is a channel-ring N and a cover-plate E' is similarly connected to the ring whereby another steam-chest is formed within the drier. The steam-chest cover E' is provided with normally closed hand-holes similar to those in the steam-chest cover E above specified.

Riveted or otherwise suitably secured to the periphery of the ring N, between the flanges thereof, are brackets *d* at regularly recurring intervals, and these brackets have sliding contact with the ring M to permit movement of the adjacent steam-chest incidental to expansion and contraction of the tubes F aforesaid.

Bolted in the last described steam-chest, at regularly recurring intervals, are angular buckets P by which water-of-condensation accumulating in said steam-chest is elevated and discharged into a stationary jacket Q that extends through an outer stuffing-box and gland fitting R with which the cover E' of said steam-chest is provided, said jacket being provided with a drain-pipe *e* at its outer end. Another jacket S is made fast to the tube-head B' to extend into the shell A, and this jacket communicates with a central opening in said tube-head. A spider $f$ is arranged within the jacket S, and a pipe T fitted in the outer end of the jacket Q is bushed in said spider. The pipe T is part of the conduit for live steam admitted to the drier, and as shown in Fig. 1, it may have elbow connection with an extraneous steam-service pipe. To prevent the jacket Q from being forced outward by steam-pressure, it is provided with a collar $f'$ abutting the stuffing-box with which said jacket engages.

Secured in connection with the ring M is a terminal hood U comprising cylindrical and beveled sections in connection with an outer angle-iron collar V, the beveled portion of said hood being provided at regularly recurring intervals with discharge outlets for which spring-controlled closures W are provided.

Inner and outer angle bars $h, i$, are riveted or otherwise fastened on the sheet-metal head of the hood U to stiffen the same and the outer angle bars $i$ serve as guides for sliding doors X that close an angular opening in the hood-head, these doors being recessed to provide clearance for the jacket Q, as is shown in Fig. 4.

As in the patent aforesaid, a series of angle rails Y are employed in connection with the shell A to impinge against flues F, these rails serving to stiffen said shell and to form compartments between said flues in which loose material, such as grain, under treatment is caught and elevated to a certain height from which it again descends, while the drier is in motion, this constant agitation of said material being simple and automatic.

Made fast to the projecting portion of the tube-head B are opposite angle-rings A' and bracing brackets C' are employed in rigid connection with said tube-head and rings. A pair of circular rails D' are rigidly secured in connection with the outer angle-rings A', and a pair of similar rails D" are likewise secured upon the outer cylindrical portion of the ring M aforesaid. The rails D', D", impinge against flanged wheels F' journaled in rockers G' that have trunnions supported upon base-blocks, said wheels and rockers constituting self-adjusting cradles, as in the patent aforesaid, and the usual stop-wheel H' is arranged to oppose the outer edge of the ring M above specified.

Fast on the shell A is a spur-gear ring I' in mesh with a driving pinion J' fast on a shaft K" for which suitable bearings are provided, and a worm-wheel L" also fast on this shaft is in mesh with a worm-pinion M' of a main-drive shaft N' that carries a friction-disk O' in opposition to a friction-wheel P' having the hub thereof secured by a pin $j$ in connection with a shifting-rod Q' that is guided in the tubular shaft L to which reference was had in the foregoing, said pin being in engagement with slots of said tubular shaft. Another pin $k$ engages the shifting-rod and extends therefrom in opposite directions, through slots of the shaft L, the ends of this pin $k$ being engaged with an annular groove in a two-part collar R' having sliding fit upon said shaft. The sections of the collar R' are provided with ears $m$ for connecting bolts $n$ and these bolts engage link-bars S' that are made fast to a slide-collar T' on one of a pair of stationary sleeves U' in which the tubular shaft L has its bearing, these sleeves being attached to base-blocks that support a pair of the rockers G' aforesaid. The slide-collar T' is herein shown as connected by spokes $o$ with a rim T" to therewith constitute a hand wheel by which to facilitate manipulation of the shifting-rod to move the friction-wheel P' transversely of the friction-disk O' in order to vary the speed of the feed-conveyer. When the adjustment is effected, a friction-block V' in the collar T' is clamped tight upon the sleeve U' by a set-screw W' to maintain said adjustment.

The material to be dried falls from the feed-spout into the shell of the drier to be agitated in the manner above specified, and a current of air maintained in the drier is heated by a circulation of steam in the tube-connected chests above specified. Water of condensation accumulating in the lowermost steam-chest is elevated and discharged by the means aforesaid, and the material under treatment in the drier finds its way into the terminal hood of said drier to escape by gravity through the peripheral openings of said hood as the weight of said material from time to time overcomes the resistance of the springs controlling the doors of said openings.

I claim:

1. A rotary drier having a steam-chest cover plate and an adjacent tube-head each provided with a circular opening, the openings being in register, an outwardly extending ring in connection with said plate and constituting a continuation of said opening therein, an exhaust-chamber, and a flexible packing-spout of said chamber in engagement with said ring.

2. A rotary drier having the tube head of a steam-chest thereof provided with a central opening, a jacket attached to said tube head in register with said opening of same, a steam-pipe bushed in a spider with which said jacket is provided, a stationary drain jacket through which said pipe extends, this drain-jacket being in steam-tight connection with the steam-chest, and buckets arranged in the steam-chest to discharge through an opening with which said drain-jacket is provided.

3. A rotary drier terminal hood having cylindrical and beveled sections, the bevel of the hood being provided with discharge-outlets at regularly recurring intervals, and spring-controlled closures for said outlets, these closures having automatic opening under gravity of material in the drier.

4. A rotary drier having a terminal hood provided with peripheral outlets, spring-controled closures for the outlets, an end opening, and sliding doors controlling said opening.

5. A rotary drier having a tube head and an extension ring of greater diameter than the main shell of said drier to which the said head and ring are joined at opposite ends of same, angle-rings and bracing brackets therefor fastened to that portion of the tube head that extends beyond said shell, circular rails rigidly secured in connection with said extension ring of the aforesaid shell and upon said angle rings, and self-adjusting cradles having wheels thereof in opposition to said rails.

In testimony that I claim the foregoing I have hereunto set my hand at Milwaukee, in the county of Milwaukee and State of Wisconsin in the presence of two witnesses.

FRANKLIN B. GIESLER.

Witnesses:
WM. H. STRAMPE,
N. E. OLIPHANT.

---

Copies of this patent may be obtained for five cents each, by addressing the "Commissioner of Patents, Washington, D. C."